United States Patent
Maeda et al.

(10) Patent No.: US 7,224,129 B2
(45) Date of Patent: May 29, 2007

(54) DISCHARGE LAMP DRIVE APPARATUS AND LIQUID CRYSTAL DISPLAY APPARATUS

(75) Inventors: Hiroshi Maeda, Tokyo (JP); Katsunori Imai, Tokyo (JP); Terumasa Toyoda, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/258,908

(22) Filed: Oct. 27, 2005

(65) Prior Publication Data
US 2006/0108947 A1    May 25, 2006

(30) Foreign Application Priority Data
Nov. 25, 2004    (JP) .............................. 2004-341020

(51) Int. Cl.
*H05B 41/24* (2006.01)
(52) U.S. Cl. ..................... 315/277; 315/291; 363/21.13
(58) Field of Classification Search ............ 315/209 R, 315/210, 213, 255, 274–287, 291, 307, 308, 315/312; 363/17, 21.13, 95
See application file for complete search history.

(56) References Cited

U.S. PATENT DOCUMENTS 6,944,034 B1 * 9/2005 Shteynberg et al. ..... 363/21.13
2004/0263092 A1 * 12/2004 Liu ............................. 315/247
2005/0035730 A1 * 2/2005 Blum ......................... 315/312
2006/0082754 A1 * 4/2006 Yang et al. ................. 315/247

FOREIGN PATENT DOCUMENTS

| JP | 6-267674   | 9/1994  |
| JP | 9-322553   | 12/1997 |
| JP | 2004-241136| 8/2004  |

OTHER PUBLICATIONS

U.S. Appl. No. 11/203,958, filed Aug. 16, 2005, Li et al.
U.S. Appl. No. 11/258,899, filed Oct. 27, 2005, Maeda et al.
U.S. Appl. No. 11/258,908, filed Oct. 27, 2005, Maeda et al.
U.S. Appl. No. 11/345,487, filed Feb. 2, 2006, Shinbo et al.

* cited by examiner

*Primary Examiner*—Tuyet Vo
*Assistant Examiner*—Jimmy Vu
(74) *Attorney, Agent, or Firm*—Oblon, Spivak, McClelland, Maier & Neustadt, P.C.

(57) ABSTRACT

Discharge lamps are respectively aligned and arranged, and a first alternating voltage output from an inverter circuit is supplied to one electrode of each discharge lamp, whilst a second alternating voltage output from the inverter circuit is supplied to the other electrode of the same. A signal processor compares a first voltage signal with a second voltage signal, and generates a current-limit signal when a difference in amplitude between these signals is not smaller than a predetermined value. The current-limit signal is supplied to the inverter circuit to help reduce the chance on an accidental electric shock.

6 Claims, 9 Drawing Sheets

(a) FIRST VOLTAGE SIGNAL Va (b) SENOND VOLTAGE SIGNAL Vb (c) ADDITION VOLTAGE V3

(d) RECTIFICATION VOLTAGE V4

(e) INTEGRATION VOLTAGE V5

(f) CURRENT-LIMIT SIGNAL S1

DISCHARGE LAMP DRIVE APPARATUS AND LIQUID CRYSTAL DISPLAY APPARATUS

BACKGROUND OF THE INVENTION

1. Field of the Invention

The present invention relates to a discharge lamp drive apparatus which drives discharge lamps used as a backlight for a liquid crystal panel, and a liquid crystal display apparatus.

2. Description of the Related Art

In recent years, with an increase in size of a screen of a liquid crystal panel, a plurality of backlight discharge lamps are used in one liquid crystal panel. As means for driving the discharge lamps, there are a scheme which uses one inverter circuit and transformers to drive one discharge lamp, and a scheme which uses one inverter circuit and transformers to drive a plurality of discharge lamps. For example, Patent literature 1 discloses the scheme which uses one inverter circuit and transformers to drive a plurality of discharge lamps.

Of the two schemes, according to the scheme which uses one inverter circuit and transformers to drive a plurality of discharge lamps, a decrease in the number of circuit components can reduce a cost and power consumption.

Meanwhile, various kinds of safety standards are required in the inverter circuit. For example, International Standard IEC60950 restricts a peak-to-peak value of a current which flows when a current-limiting test resistance of 2 k$\Omega$ is interposed between an output winding terminal of a transformer and a ground in order to avoid an electric shock accident.

Specifically, assuming that a peak-to-peak value of a current flowing through the current-limiting test resistance is $\alpha$ mA and a frequency of an output voltage is $\beta$ kHz, the following expression must be achieved:

if $\beta > 1$, $\alpha \leq 0.7\beta$ and $\alpha \leq 70$

In the scheme which drives one discharge lamp by using one inverter circuit and transformers, constituting one type of a current-limiting element by using a winding resistance of an output winding of a transformer and a leakage inductance can readily satisfy International Standard IEC60950.

On the contrary, in the scheme which drives a plurality of discharge lamps by using one inverter circuit and transformers, since a winding current of the transformer increases in proportion to the number of the discharge lamps, a current-limiting element having a large resistance value must be constituted by adjusting a winding of the transformer to increase a winding resistance value or by adjusting a resonance value or by adjusting a resonance point to increase the leakage inductance in order to satisfy International Standard IEC60950, and a countermeasure for meeting the standard is not necessarily easy.

Further, since the winding current of the transformer increases, the winding resistance value and the leakage inductance must be reduced in terms of promotion of high efficiency.

Therefore, in the scheme which drives a plurality of discharge lamps by using one inverter circuit and transformers, it is very difficult to satisfy International Standard IEC60950.

Furthermore, when International Standard IEC60950 cannot be met, reinforced insulation must be applied to the transformer, which obstructs a reduction in cost and size of a product.

Patent literature 1: JP-A-6-267674

SUMMARY OF THE INVENTION

It is an object of the present invention to provide a discharge lamp drive apparatus which can avoid an electric shock accident, and a liquid crystal display apparatus.

It is another object of the present invention to provide a discharge lamp drive apparatus which can satisfy International Standard IEC60950, and a liquid crystal display apparatus.

To achieve these and other objects, a discharge lamp drive apparatus according to the present invention comprises: an inverter circuit; first and second transformers; and a signal processor. The inverter circuit is a circuit which converts a direct-current voltage into an alternating voltage and outputs the converted voltage. The first transformer receives the alternating voltage from the inverter circuit at an input winding thereof, and outputs a first alternating voltage from an output winding thereof. The second transformer receives the alternating voltage from the inverter circuit at an input winding thereof, and outputs a second alternating voltage from an output winding thereof.

The signal processor receives respective voltage signals indicative of the first alternating voltage and the second alternating voltage, and generates a current-limit signal when a difference in amplitude between both the voltage signals is not smaller than a predetermined value. The inverter circuit is controlled by the current-limit signal supplied from the signal processor.

The discharge lamp drive apparatus according to the present invention is combined with a plurality of discharge lamps and a liquid crystal plate to constitute a liquid crystal display apparatus. The plurality of discharge lamps are respectively aligned and arranged, and the first alternating voltage is supplied to one electrode of each discharge lamp, whilst the second alternating voltage is supplied to the other electrode of the same. The liquid crystal plate is arranged on a front surface of the discharge lamps.

The discharge lamps are respectively driven in parallel and turned on by the first alternating voltage supplied to one electrode of each discharge lamp and the second alternating voltage supplied to the other electrode of the same. Since the liquid crystal plate is arranged on the front side of the discharge lamps, the discharge lamps function as a backlight for the liquid crystal plate.

In the above-described liquid crystal display apparatus, for example, when a person has accidentally touched an output winding (a high-voltage side winding) of the first transformer, an impedance between a high-voltage side output terminal of the output winding and a reference potential (which is generally a ground potential) becomes small, and hence an amplitude of the first alternating voltage is reduced. Likewise, when a person has touched the second transformer, an amplitude of the second alternating voltage is reduced.

The signal processor is configured to compare a first voltage signal concerning the first alternating voltage with a second voltage signal concerning the second alternating voltage, and generate a current-limit signal when a difference in amplitude between these signals is not smaller than a predetermined value.

Therefore, when the first voltage signal concerning the first alternating voltage is compared with the second voltage signal concerning the second alternating voltage and, for example, the first voltage signal is smaller as a result of comparison, it is determined that a person has touched the first transformer, thereby generating the current-limit signal. Likewise, when the second voltage signal is smaller, it is determined that a person has touched the second transformer, thereby generating the current-limit signal.

The inverter circuit is controlled by the current-limit signal supplied from the signal processor. As a control conformation of the inverter circuit based on the current-limit signal, a current flowing through the output winding may be limited with respect to only the transformer which has been touched by a person, or currents flowing through the output windings of all the transformers may be limited.

With such limitation of the currents, the discharge lamp drive apparatus according to the present invention can avoid an electric shock accident. Furthermore, International Standard IEC60950 can be satisfied.

As described above, according to the present invention, the following effects can be obtained.
(a) It is possible to provide a discharge lamp drive apparatus which can avoid an electric shock accident, and a liquid crystal display apparatus.
(b) It is possible to provide a discharge lamp drive apparatus which can satisfy International Standard IEC60950, and a liquid crystal display apparatus.

The present invention will be more fully understood from the detailed description given here in below and the accompanying drawings which are given by way of illustration only, and thus are not to be considered as limiting the present invention.

DETAILED DESCRIPTION OF THE PREFERRED EMBODIMENTS

Figure 1:
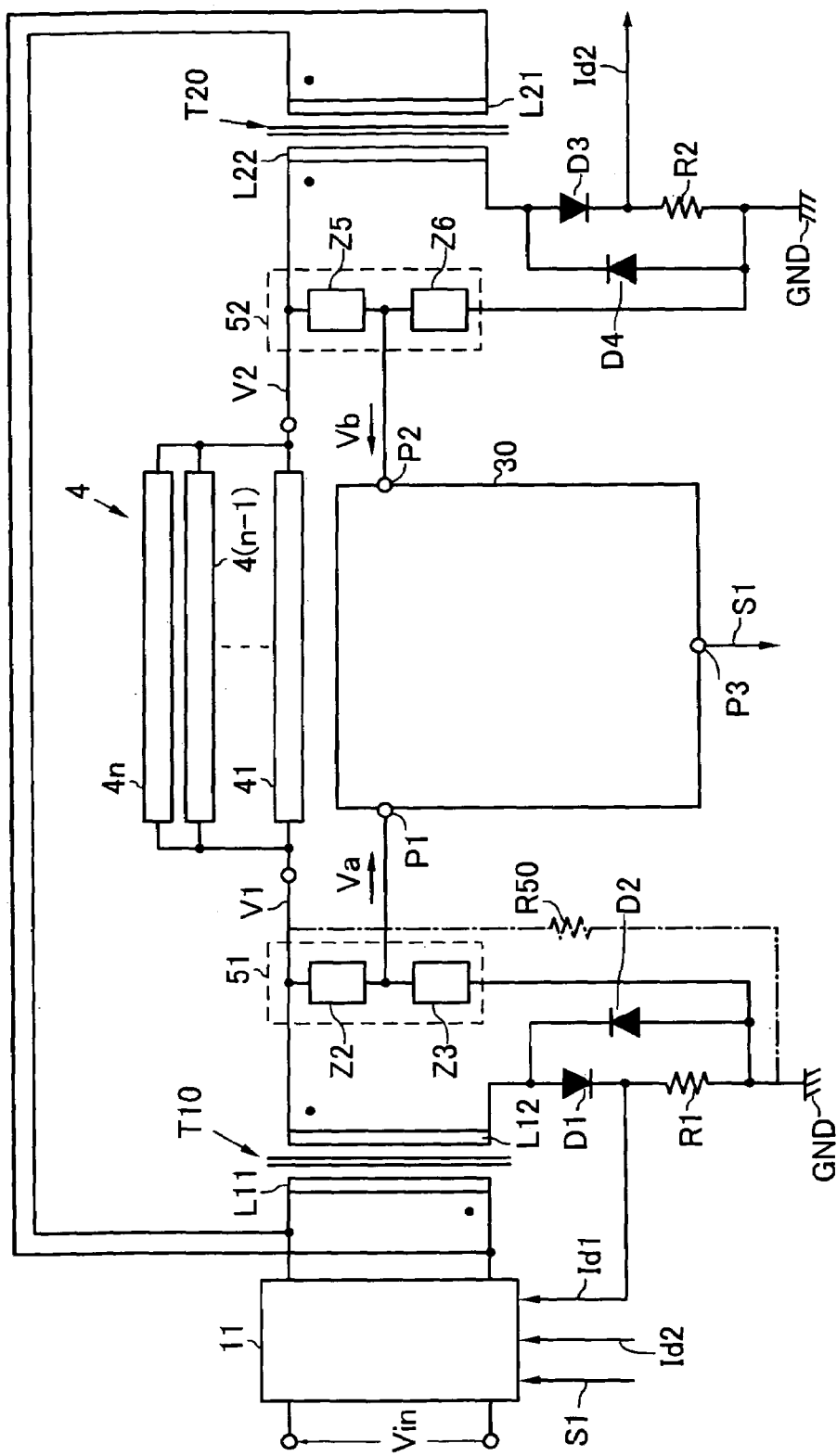
FIG. 1 is an electric circuit diagram showing an example of a discharge lamp lighting apparatus using a discharge lamp drive apparatus according to the present invention.

Referring to FIG. 1, a discharge lamp lighting apparatus is used for a backlight device in, e.g., a liquid crystal TV, a monitor or the like. The illustrated discharge lamp lighting apparatus adopts a differential drive scheme (a floating scheme), and drives a discharge lamp group 4 from both sides.

The discharge lamp lighting apparatus includes an inverter circuit 11, a first transformer T10, a second transformer T20, voltage division circuits 51 and 52, a signal processor 30, and the discharge lamp group 4. A circuit section excluding the discharge lamp group 4 from the discharge lamp lighting apparatus corresponds to a discharge lamp drive apparatus according to the present invention, and this is a target of business as a device different from the discharge lamp group 4.

The inverter circuit 11 converts a direct-current power Vin into an alternating voltage and outputs the converted voltage. The direct-current power Vin is generally obtained by converting a commercial alternating current into direct-current electricity and then further converting this electricity by using a DC/DC converter.

The first transformer T10 receives an alternating voltage from the inverter circuit 11 at an input winding L11 thereof, and outputs a first alternating voltage V1 from a high-voltage side output terminal of an output winding L12 thereof. The first alternating voltage V1 is, e.g., an alternating high voltage which is, e.g., approximately 800 V. The second transformer T20 also has the same configuration and function as those of the first transformer T10. That is, the second transformer T20 receives an alternating voltage at an input winding 21 thereof, and outputs a second alternating voltage V2 from an output winding L22 thereof.

In case of driving the discharge lamp group 4 from both sides, the first alternating voltage V1 generated in the output winding L12 and the second alternating voltage V2 generated in the output winding L22 have phases opposite to each other. However, in case of driving the discharge lamp group 4 from one side, these voltage may be in-phase. In case of differential driving, an insulation voltage processing of the inverter circuit 11 can be facilitated. In this embodiment, a description will be given on an example of differential driving.

The voltage division circuit 51 is provided between the high-voltage side output terminal of the output winding L12 and the ground (GND). The voltage division circuit 51 divides an alternating voltage which appears between the high-voltage side output terminal of the output winding L12 and the ground (GND) by using impedance elements Z2 and Z3, and outputs a first voltage signal Va from a connection point of series circuits of the impedance elements Z2 and Z3. The voltage division circuit 52 is provided between the high-voltage side output terminal of the output winding L22 and the ground like the voltage division circuit 51. The voltage division circuit 52 outputs a second voltage signal Vb from a connection point of series circuits of impedance elements Z5 and Z6.

It is preferable for the voltage division circuits 51 and 52 to divide each output voltage into, e.g., approximately 1 to 10 V. The impedance elements Z2, Z3, Z5 and Z6 are constituted of, e.g., capacitors, resistances, inductors or combinations of such members.

Further, in the discharge lamp drive apparatus according to the present invention, each of the first and second transformer T10 and T20 is provided with windings which are used to detect a voltage generated in a corresponding transformer, and a voltage generated in windings may be determined as a first or second voltage signal Va or Vb. That is because the voltage generated in windings corresponds to an intensity of the first or second alternating voltage V1 or V2.

The signal processor 30 receives the respective voltage signals, i.e., the first voltage signal Va and the second voltage signal Vb, and generates a current-limit signal S1 when a difference between amplitudes of both the voltage signals Va and Vb is not smaller than a predetermined value. The signal processor 30 may be constituted by using software, or by using an IC, an electronic component or the like. The inverter circuit 11 is controlled by the current-limit signal SI supplied from the signal processor 30.

The discharge lamp group 4 includes n discharge lamps 4*l* to 4*n*. As the discharge lamps 4*l* to 4*n*, there are, e.g., CCFLs such as cold-cathode tubes, EEFLs (External Electrode Fluorescent Lamps) and others. In the drawing, the discharge lamps 4*l* to 4*n* are EEFLs. The discharge lamps 4*l* to 4*n* are connected with each other in parallel, and one electrode of each discharge lamp is connected with the output winding L12 of the first transformer T10, whilst the other electrode of the same is connected with the output winding L22 of the second transformer T20.

In the illustrated embodiment, since the discharge lamps 4*l* to 4*n* are connected between the output winding L12 of the first transformer T10 and the output winding L22 of the second transformer T20, when an object (including a person) touches the first transformer T10 and an impedance between the high-voltage side output terminal of the output winding L12 and the reference potential (GND) thereby becomes small, an amplitude of the first alternating voltage V1 is reduced, and an amplitude of the second alternating voltage V2 is increased. Likewise, when an object touches the second transformer T20, the amplitude of the second alternating voltage V2 is reduced, and the amplitude of the first alternating voltage V1 is increased.

Diodes D1 and D2 and a resistance R1 constitute a first current detection circuit, and supply a current detection signal Id1 to the inverter circuit 11. Diodes D3 and D4 and a resistance R2 constitute a second current detection circuit, and supply a current detection signal Id2 to the inverter circuit 11. The current detection signals Id1 and Id2 are used, for, e.g., constant current control.

Figure 2:
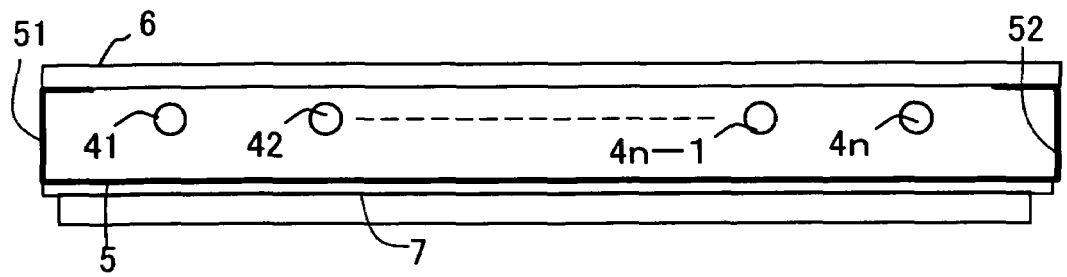
FIG. 2 is a partial cross-sectional view of a liquid crystal display apparatus in which the discharge lamp lighting apparatus depicted in FIG. 1 is incorporated.

The discharge lamp lighting apparatus shown in FIG. 1 is combined with a liquid crystal plate to constitute a liquid crystal display apparatus. FIG. 2 is a partial cross-sectional view of a liquid crystal display apparatus in which the discharge lamp lighting apparatus depicted in FIG. 1 is incorporated. The illustrated liquid crystal display apparatus has a configuration in which n discharge lamps 4*l* to 4*n* are arranged at intervals on one surface of a rear surface plate 5 and a liquid crystal plate 6 is arranged on a front surface of the discharge lamps 4*l* to 4*n*. The liquid crystal plate 6 is attached at raised portions 51 and 52 which are raised around the rear surface plate 5. A substrate 7 on which the discharge lamp lighting apparatus having the circuit configuration shown in FIG. 1 is mounted is attached on the other surface of the rear surface plate 5.

Operations of the discharge lamp lighting apparatus and the liquid crystal display apparatus described with reference to FIGS. 1 and 2 will now be explained. In this drawings, each of the discharge lamps 4*l* to 4*n* is driven and turned on by the first alternating voltage V1 supplied to one electrode of each discharge lamp and the second alternating voltage V2 fed to the other electrode of the same. Since the liquid crystal plate 7 is arranged on the front surface of the discharge lamps 4*l* to 4*n*, the discharge lamps 4*l* to 4*n* function as a backlight for the liquid crystal plate 7 (see FIG. 2).

In the driving state of the above-described liquid crystal display apparatus, for example, when a person accidentally touches the output winding L12 (the high-voltage side winding) of the first transformer T10, an impedance between the high-voltage side output terminal of the output winding L12 and the reference potential (GND) becomes small, and hence an amplitude of the first alternating voltage V1 is reduced. Likewise, when a person touches the second transformer T20, an amplitude of the second alternating voltage V2 is reduced.

The signal processor 30 is configured to compare the first voltage signal Va concerning the first alternating voltage V1 with the second voltage signal Vb concerning the second alternating voltage V2, and generate the current-limit signal S1 when a difference in amplitude between these signals is not smaller than a predetermined value.

Therefore, the first voltage signal Va concerning the first alternating voltage V1 is compared with the second voltage signal Vb concerning the second alternating voltage V2, and it is determined that a person has touched the first transformer T10 when, e.g., the first voltage signal Va is smaller, thereby generating the current-limit signal S1. Likewise, the first and second voltage signals Va and Vb are compared with each other, and it is determined that a person has touched the second transformer T20 when the second voltage signal Vb is smaller, thereby generating the current-limit signal S1.

The inverter circuit 11 is controlled by the current-limit signal S1 supplied from the signal processor 30. As a control conformation of the inverter circuit 11 based on the current-limit signal S1, a current flowing through the output winding may be limited with respect to only a transformer that a person has touched, or currents flowing through the output windings of all the transformers may be limited. Such limitation of currents can avoid an electric shock accident.

Moreover, in case of limiting currents, a current-limiting test resistance R50 of 2 kΩ is interposed between the high-voltage side output terminal of the output winding L12 (or the output winding L22) and the ground. Assuming that a peak-to-peak value of a current flowing through the current-limiting test resistance R50 is α mA and a frequency of the output voltage is β kHz, it is preferable to satisfy the following expression:

if β>1,

α≦0.7β and α≦70

That is because such limitation of the current can satisfy International Standard IEC60950.

Additionally, since the illustrated embodiment adopts a scheme of driving the n discharge lamps 4*l* to 4*n* by using a total of two transformers T10 and T20, and hence the number of transformers and the number of circuits which supply power to the transformers can be decreased, thereby reducing a size and a cost of a product.

Figure 3:
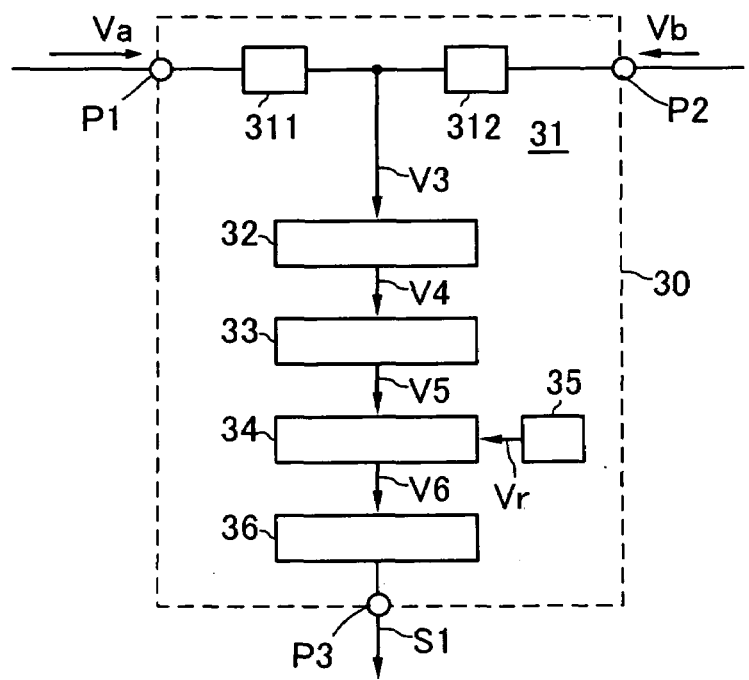
FIG. 3 is a block diagram showing a concrete structural example of a signal processor.

FIG. 3 is a block diagram showing an embodiment of a concrete configuration of the signal processor 30. In the drawing, the signal processor 30 includes an addition circuit 31, a rectification circuit 32, an integration circuit 33, a comparison circuit 34, a reference voltage generation circuit 35, and a judgment circuit 36.

The signal processing circuit 30 can be arbitrarily configured. For example, a multiplication circuit, an AND circuit or an NAND circuit may be used in place of the addition circuit. Further, when the signal processor 30 is configured by using software, it is considered that the respective circuit portions 31 to 36 indicate a processing procedure.

The addition circuit 31 includes circuit elements 311 and 312. In the drawing, each of the circuit elements 311 and 312 is constituted of a resistance. Each of the circuit elements 311 and 312 may be configured of a capacitor, an inductor or the like. The addition circuit 31 adds the first voltage signal Va to the second voltage signal Vb, and outputs an addition voltage V3.

The rectification circuit 32 rectifies the addition voltage V3 and outputs a rectification voltage V4. The integration circuit 33 integrates the rectification voltage V4 and outputs an integration voltage V5. The comparison circuit 34 compares a reference voltage Vr generated by the reference voltage generation circuit 35 with the integration voltage V5, and generates a comparison voltage V6 only when the integration voltage V5 is larger than the reference voltage Vr.

The judgment circuit 36 is, e.g., a latch circuit, and outputs the current-limit signal S1 through an output terminal P3 when the comparison voltage V6 is generated, but does not output the current-limit signal S1 when the comparison voltage V6 is not generated.

Figure 4:
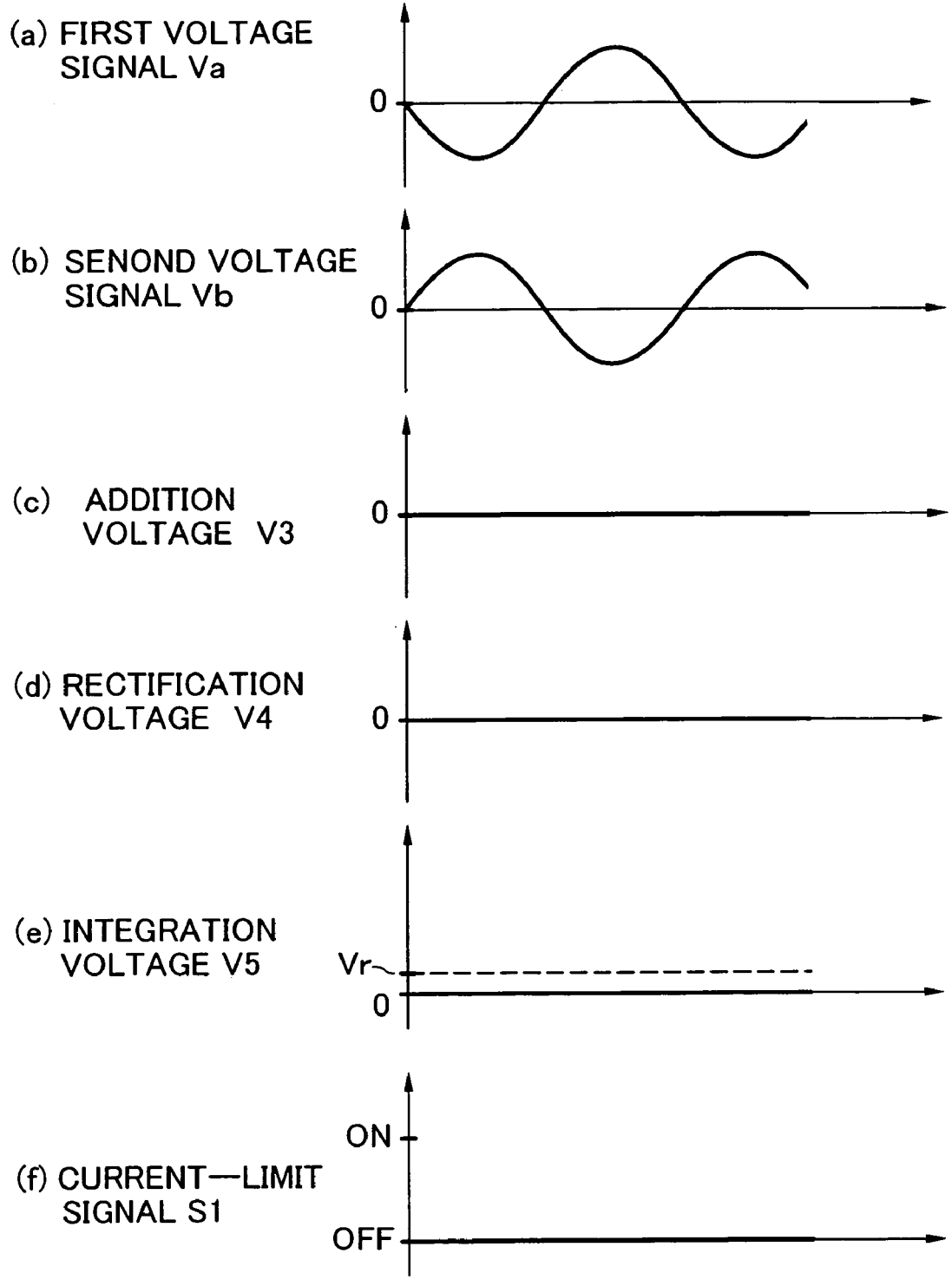
FIG. 4 is an operating waveform chart when an object is not touching first and second transformers.
Figure 5:
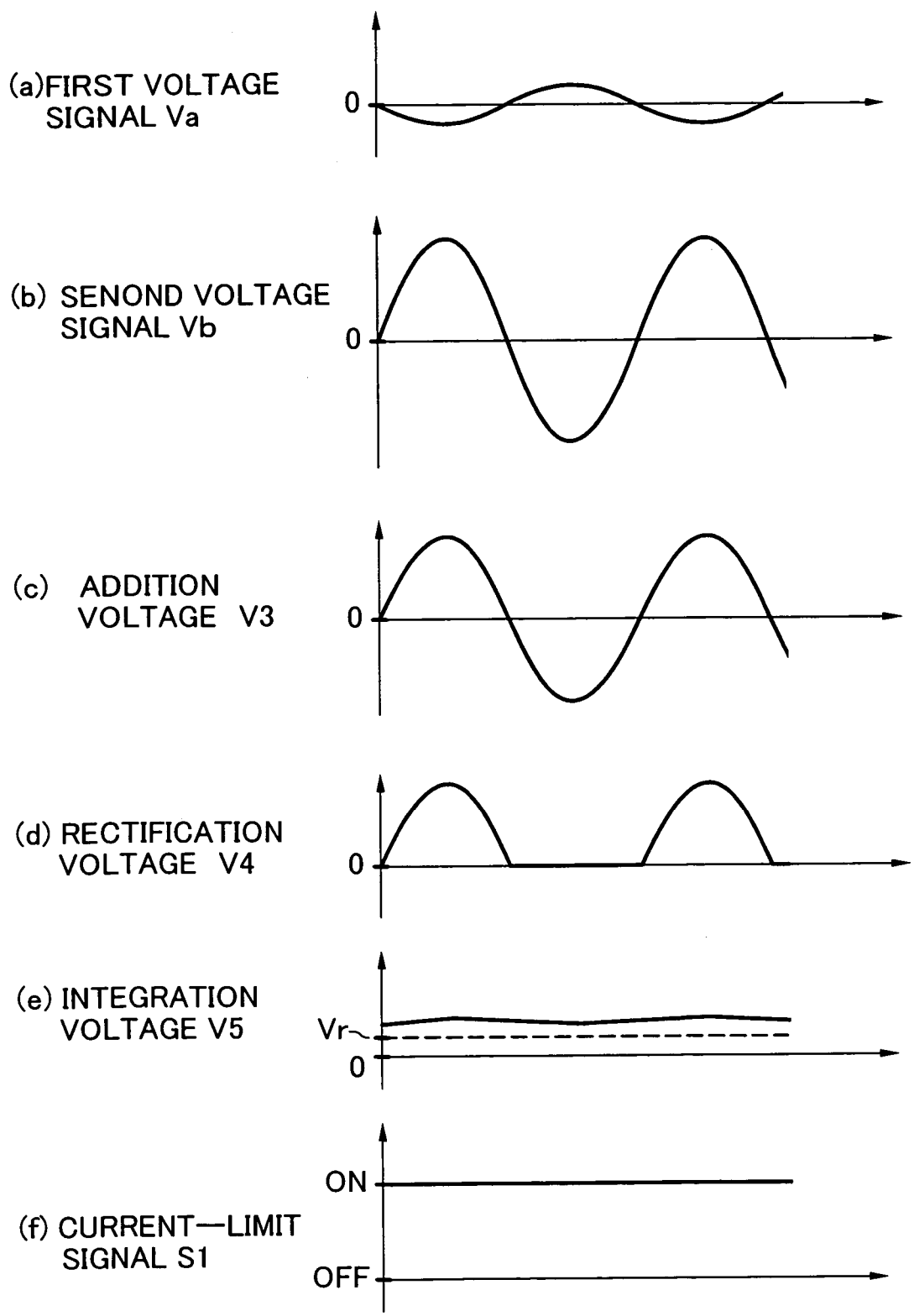
FIG. 5 is an operating waveform chart when an object is touching the first transformer.

A circuit operation of the signal processor depicted in FIG. 3 will now be described in detail with reference to FIGS. 4 and 5. FIG. 4 is an operating waveform chart when an object (including a person) is not touching the output windings L12 and L22 of the first and second transformers T10 and T20, and FIG. 5 is an operating waveform chart when an object is touching the output winding L12 of the first transformer T10.

When an object is not touching the first and second transformers T10 and T20, the first and second voltage signals Va and Vb have substantially the same amplitudes, and become alternating voltages having reversed phases. FIGS. 4(a) and (b) show the first and second voltage signals Va and Vb.

Since the first and second voltage signals Va and Vb are alternating voltages having substantially the same amplitude and reversed phases, the addition voltage V3 becomes substantially 0 V as shown in FIG. 4(c). Since the addition voltage V3 is substantially 0 V, the rectification voltage V4 and the integration voltage V5 respectively become 0 V as shown in FIGS. 4(d) and (e).

Since the integration voltage V5 is 0 V and smaller than the reference voltage Vr, the comparison voltage V6 is not generated, and the current-limit signal S1 is not output as shown in FIG. 4(f). Therefore, when an object is not touching the first and second transformers T10 and T20, the inverter circuit 11 continues its operation.

A description will now be given as to an operation when an object is touching the first transformer T10.

In this case, since an impedance between the output winding L12 and the reference potential GND becomes small, an amplitude of the first voltage signal Va is reduced and an amplitude of the second voltage signal Vb is increased as shown in FIGS. 5(a) and (b).

Since the amplitudes of the first and second voltage signals Va and Vb are not equal to each other, the addition voltage V3 does not become 0 V as shown in FIG. 5(c). Since the addition voltage V3 is not 0 V, the integration voltage V5 obtained by rectifying and integrating the addition voltage V3 has a voltage value which is not smaller than that of the reference voltage Vr as shown in FIG. 5(e). Since the integration voltage V5 is not smaller than the reference voltage Vr, the comparison circuit 34 generates the comparison voltage V6, and the current-limit signal S1 is output as shown in FIG. 5(f).

The current-limit signal S1 output from the signal processor 30 is supplied to the inverter circuit 11, and the inverter circuit 11 thereby stops its operation. As a result, the currents supplied to the output windings L12 and L22 of the transformers are limited, thereby avoiding an electric shock accident. The same explanation as that in a case where an object is touching the first transformer T10 can be given on a case where an object is touching the second transformer T20.

In the illustrated embodiment, since the reference voltage Vr can be set to an arbitrary value by using the reference voltage generation circuit 35, limit operating points of the currents can be accurately set without being affected by impedances or the like of the first and second transformers T10 and T20.

In the illustrated embodiment, since the current-limit signal S1 is generated by using the voltage integrated by the integration circuit, an erroneous operation due to irregularities or the like in the circuit elements can be avoided, and a time taken to apply the current limiting operation can be adjusted.

Furthermore, in the present invention, for example, if the inverter circuit 11 is configured to stop when the current-limit signal S1 is supplied to a control IC of the inverter circuit 11, a current output from the inverter circuit 11 can be interrupted at a high speed.

Moreover, the current-limit signal S1 can be fed back to a PWM control circuit of the inverter circuit 11 so that an ON-duty can be narrowed in accordance with a value of the current-limit signal S1, thereby limiting the current flowing through the output winding.

Figure 6:
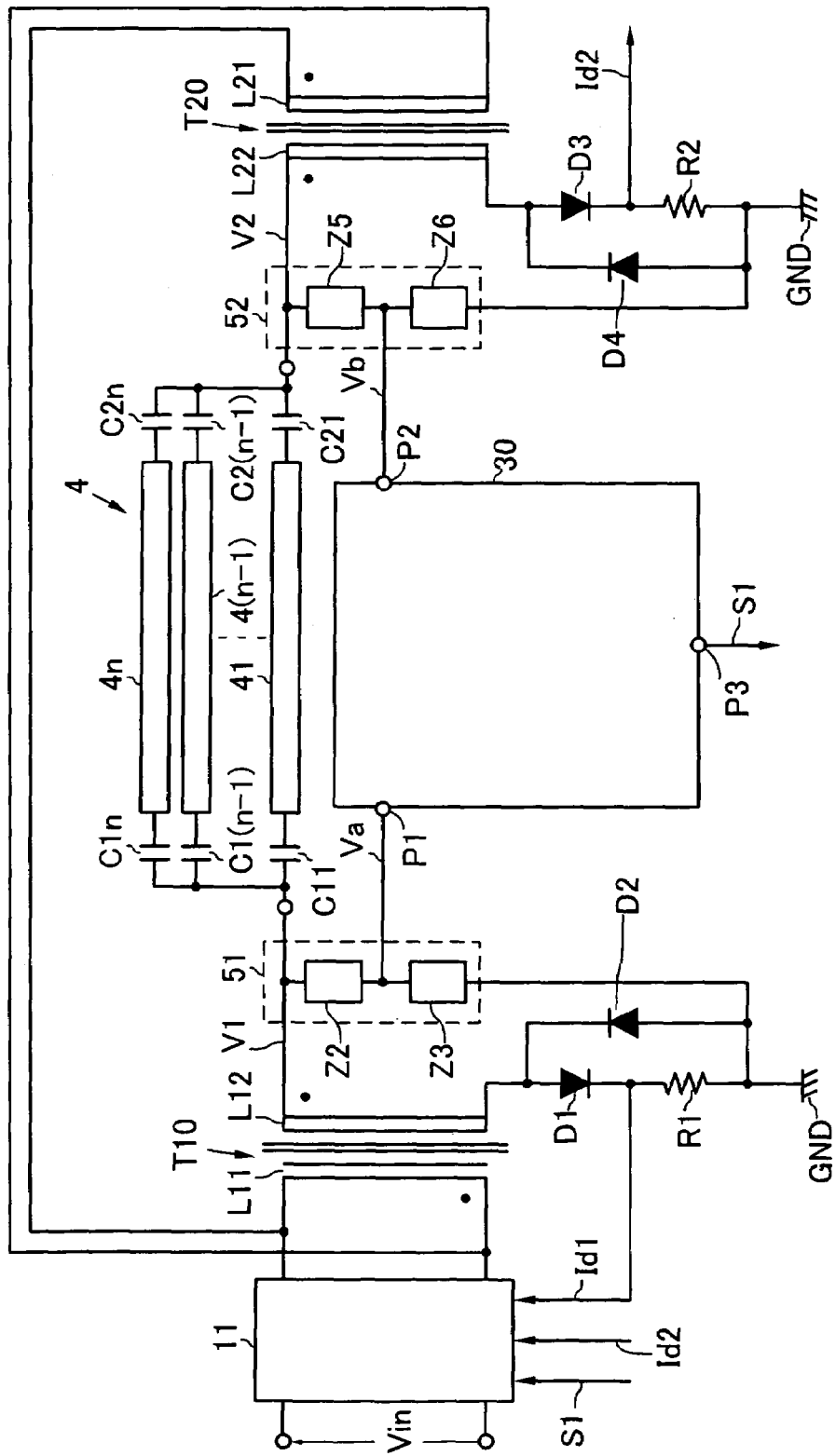
FIG. 6 is an electric circuit diagram showing another example of the discharge lamp lighting apparatus using the discharge lamp drive apparatus according to the present invention.

FIG. 6 is an electric circuit diagram showing another embodiment of the discharge lamp drive apparatus according to the present invention. In the drawing, like reference numerals denote parts equal to the constituent parts shown in FIGS. 1 to 5, thereby eliminating the tautological explanation.

The illustrated discharge lamp drive apparatus is different from the discharge lamp drive apparatus depicted in FIG. 1 in that each of discharge lamps 4l to 4n is a CCFL and capacitors C1l to C1n and C2l to C2n are provided at both ends of the discharge lamps 4l to 4n.

Since the discharge lamp drive apparatus shown in FIG. 6 has substantially the same configuration as that of the discharge lamp drive apparatus depicted in FIGS. 1 to 5, thereby obtaining the same functions and effects.

Figure 7:
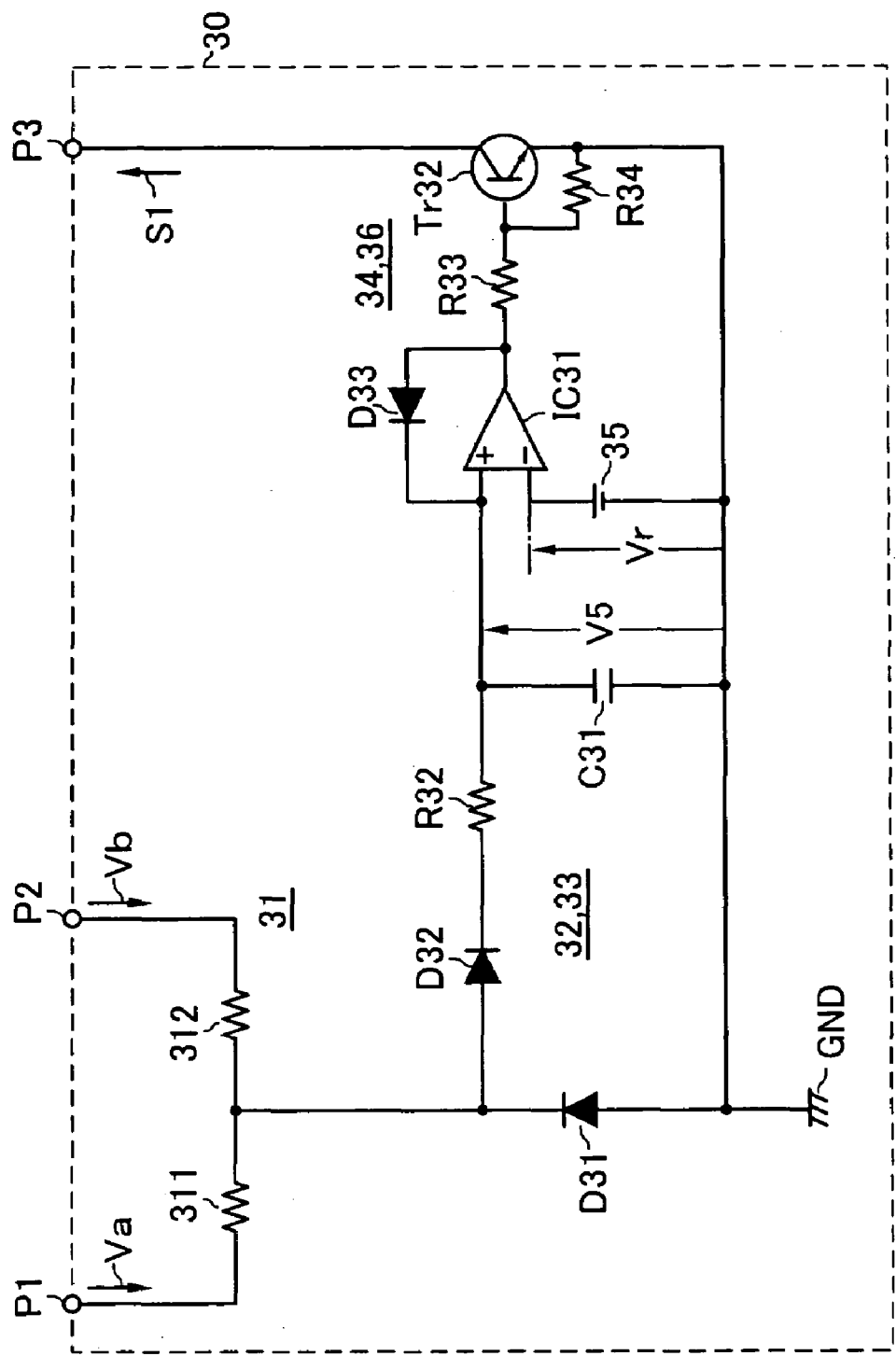
FIG. 7 is an electric circuit diagram showing another embodiment of the signal processor.

FIG. 7 is an electric circuit diagram showing another embodiment of the signal processor 30 used in the discharge lamp drive apparatus according to the present invention. In the drawing, like reference numerals denote parts equal to the constituent parts shown in FIGS. 1 to 6, thereby eliminating the tautological explanation.

In the signal processor 30 shown in FIG. 7, a rectification circuit 32 and an integration circuit 33 subject a voltage supplied from an addition circuit 31 to half-wave rectification and integration by using diodes D31 and D32, a resistance R32 and a capacitor C31.

A comparison circuit 34 and a judgment circuit 36 constitute a positive feedback circuit (a latch) using an operational amplifier IC31, turn on a transistor Tr32 and output a current-limit signal S1 through an output terminal P3 when an integration voltage V5 is larger than a reference voltage Vr. When the integration voltage V5 is smaller than the reference voltage Vr, the transistor Tr32 is turned off, and the current-limit signal S1 is not output.

Figure 8:
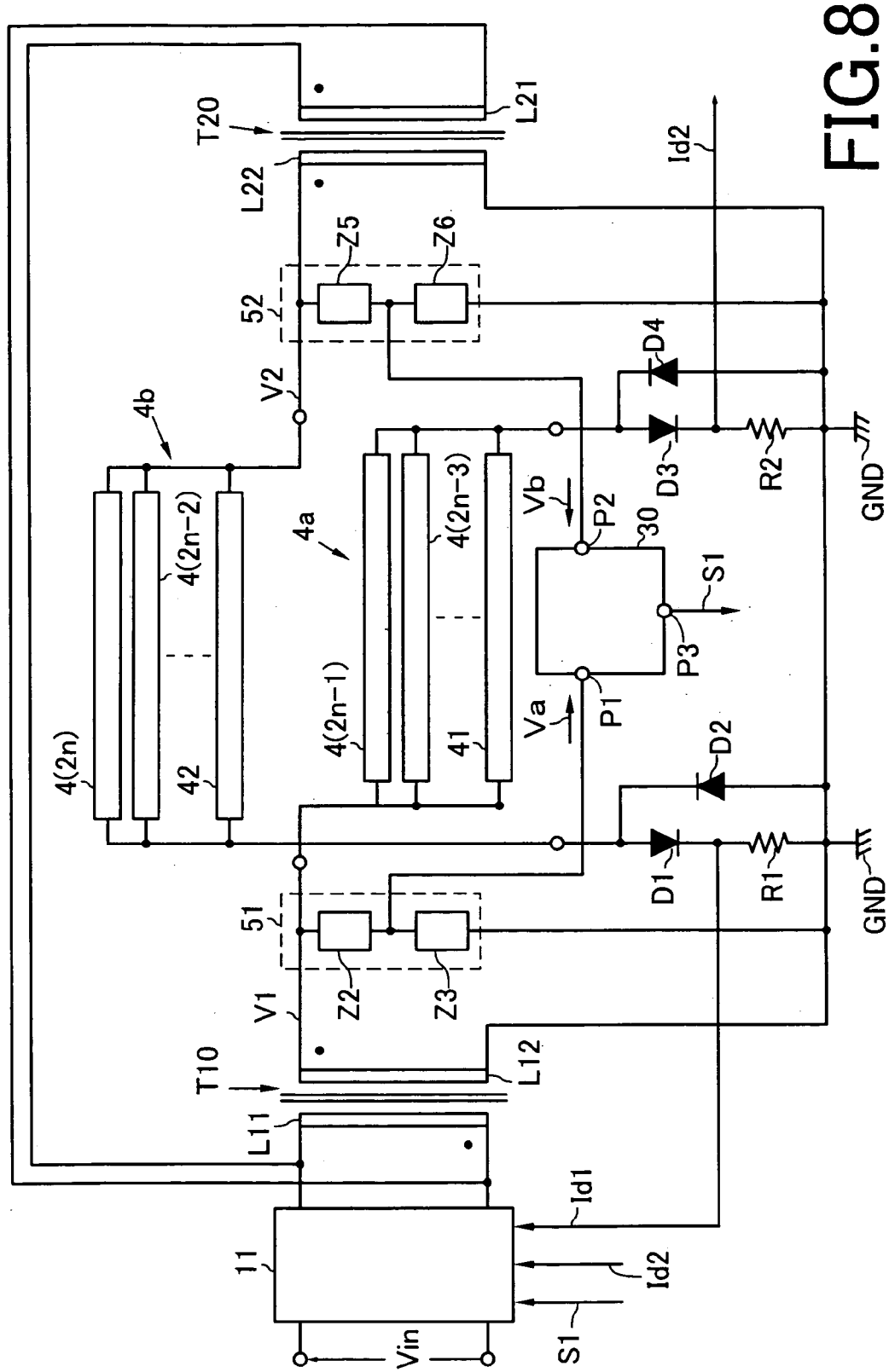
FIG. 8 is an electric circuit diagram showing still another example of the discharge lamp lighting apparatus using the discharge lamp drive apparatus according to the present invention.

FIG. 8 is an electric circuit diagram showing still another embodiment of the discharge lamp drive apparatus according to the present invention. The illustrated discharge lamp drive apparatus is of a one-side drive type, and different from the discharge lamp drive apparatus depicted in FIG. 1 in that a first discharge lamp group 4a and a second discharge lamp group 4b are included. In the drawing, like reference numerals denote parts equal to the constituent parts shown in FIGS. 1 to 7, thereby eliminating the tautological explanation.

In the illustrated discharge lamp drive apparatus, the first discharge lamp group 4a includes discharge lamps 4l to 4(2n-1). One end side of the first discharge lamp group 4a is connected with an output winding L12 of a first transformer T10, and the other end side of the same is connected to the ground GND through diodes D3 and D4 and a resistance R2.

The second discharge lamp group 4b includes discharge lamps 42 to 4(2n). One end side of the second discharge lamp group 4b is connected with an output winding L22 of a second transformer T20, and the other end side of the same is connected to the ground GND through diodes D1 and D2 and a resistance R1.

First and second voltage signals Va and Vb are in opposite phase, and these signals have substantially the same amplitude values when an object is not touching the first and second transformers T10 and T20.

In the illustrated embodiment, since the first and second discharge lamp groups 4a and 4b are not connected between the output winding L12 and the output winding L22, an amplitude of the first voltage signal Va does not vary when an impedance between the output winding L22 and a reference potential GND becomes small. Likewise, when an impedance between the output winding L12 and the reference potential GND becomes small, an amplitude of the second voltage signal Vb does not vary.

The discharge lamp drive apparatus shown in FIG. 8 has substantially the same configuration as that of the discharge lamp drive apparatus depicted in FIGS. 1 to 7, thereby obtaining the same functions and effects.

Figure 9:
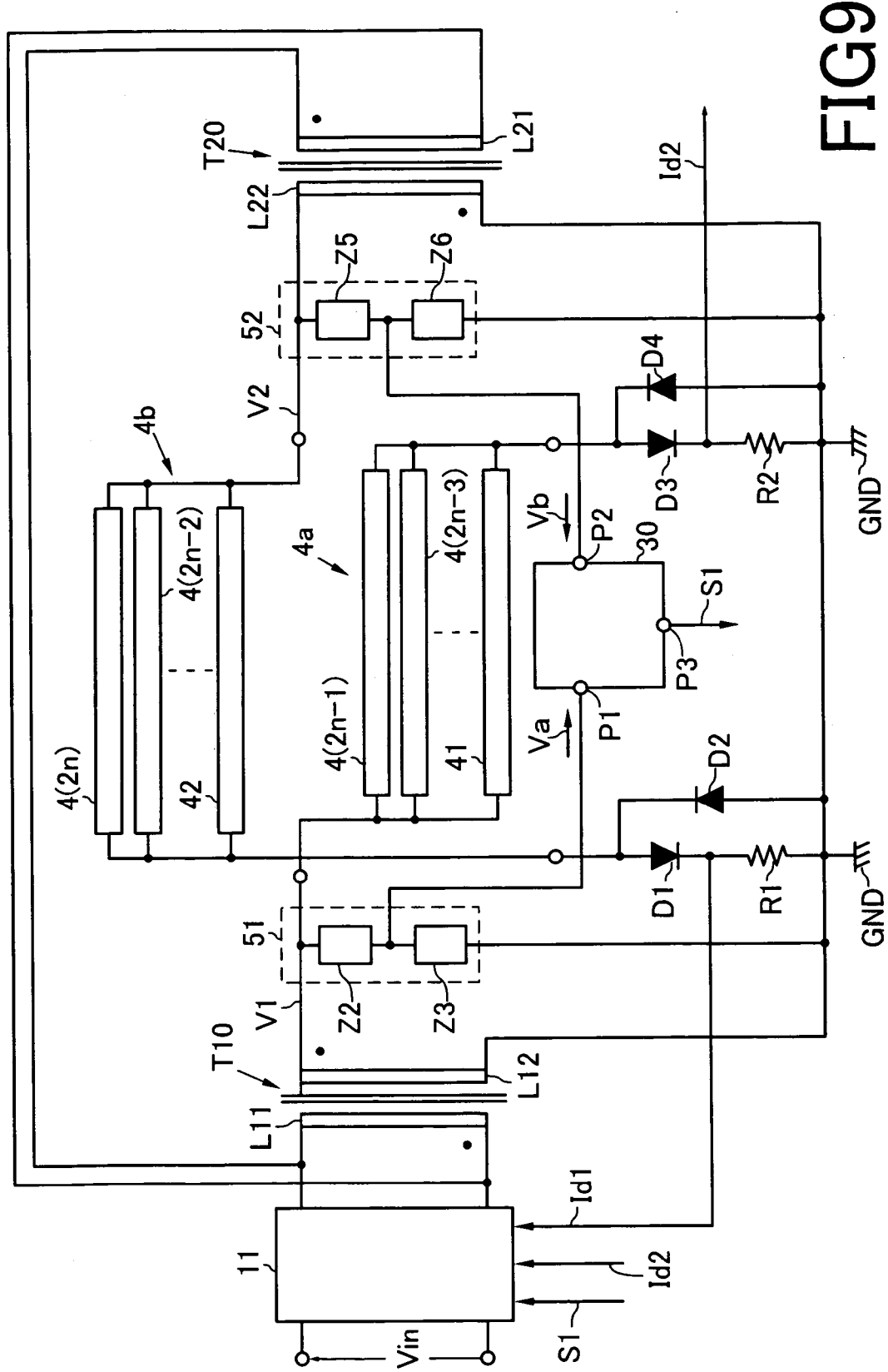
FIG. 9 is an electric circuit diagram showing yet another example of the discharge lamp lighting apparatus using the discharge lamp drive apparatus according to the present invention.
Figure 10:
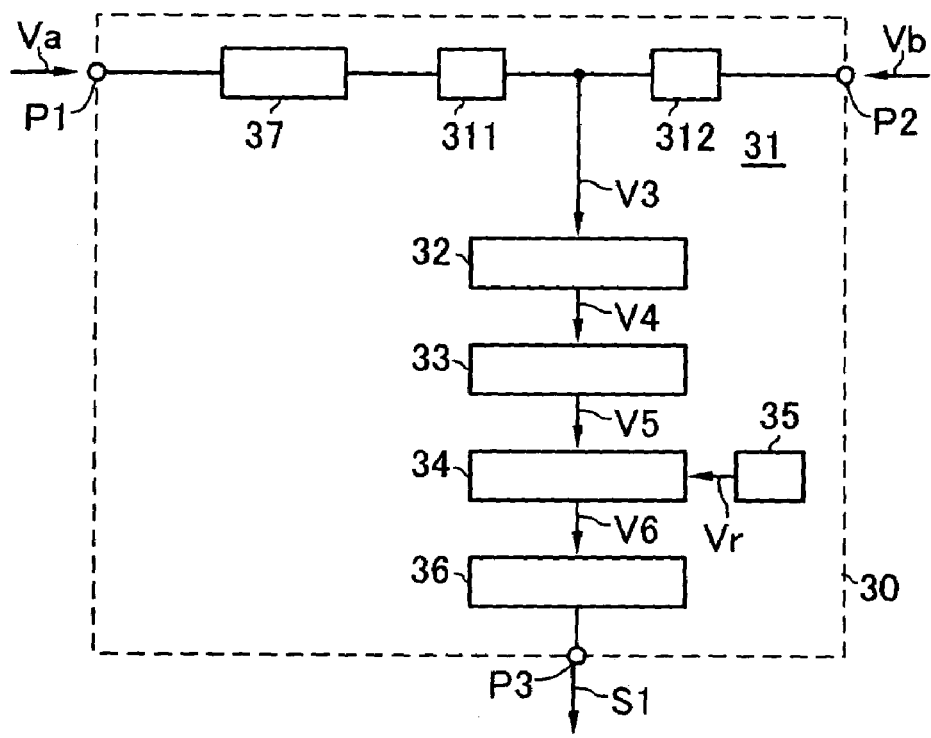
FIG. 10 is an electric circuit diagram showing a signal processor of the discharge lamp lighting apparatus depicted in FIG. 9.

FIG. 9 is an electric circuit diagram showing yet another embodiment of the discharge lamp drive apparatus according to the present invention, and FIG. 10 is an electric circuit diagram showing a signal processor 30 of the discharge lamp drive apparatus depicted in FIG. 9. The illustrated discharge lamp drive apparatus is of a one-side drive type. In the drawings, like reference numerals denote parts equal to the constituent parts shown in FIGS. 1 to 8, thereby eliminating the tautological explanation.

In FIG. 9, a second transformer T20 has a polarity opposite to that of the second transformer T20 shown in FIG. 8, and first and second voltage signals Va and Vb are in-phase with each other. When any object is not touching first and second transformers T10 and T20, the first and second voltage signals Va and Vb have substantially the same amplitude values.

In FIG. 10, the signal processor 30 is different from the signal processor 30 of the discharge lamp drive apparatus depicted in FIG. 1 in that an inverting circuit 37 is provided. The inverting circuit 37 receives the first voltage signal Va through a first input terminal P1, and supplies a voltage obtained by inverting the first voltage signal Va to an addition circuit 31. The inverting circuit 37 may be configured to invert positive and negative polarities of amplitudes, or delay (or advance) a phase by π (rad).

The addition circuit 31, a rectification circuit 32, an integration circuit 33, a comparison circuit 34, a reference voltage generation circuit 35 and a judgment circuit 36 perform the same current limiting operation as that of the signal processor 30 shown in FIG. 1 by using both a voltage obtained by inverting the first voltage signal Va and the second voltage signal Vb.

The discharge lamp drive apparatus shown in FIG. 9 has substantially the same configuration as that of the discharge lamp drive apparatus depicted in FIGS. 1 to 8, thereby obtaining the same functions and effects.

While the present invention has been particularly shown and described with reference to preferred embodiments thereof, it will be understood by those skilled in the art that various changes in form and detail may be made therein without departing from the spirit, scope and teaching of the invention.

What is claimed is:

1. A discharge lamp drive apparatus comprising:
   an inverter circuit;
   first and second transformers; and
   a signal processor, wherein
   the inverter circuit is a circuit which converts a direct-current voltage into an alternating voltage and outputs the converted voltage,
   the first transformer receives the alternating voltage from the inverter circuit at an input winding thereof, and outputs a first alternating voltage from an output winding thereof,
   the second transformer receives the alternating voltage from the inverter circuit at an input winding thereof, and outputs a second alternating voltage from an output winding thereof,
   the signal processor receives respective voltage signals indicative of the first alternating voltage and the second alternating voltage, and generates a current-limit signal when a difference in amplitude between both the voltage signals is not smaller than a predetermined value, and
   the inverter circuit is controlled by the current-limit signal supplied from the signal processor.

2. The discharge lamp drive apparatus according to claim 1, wherein the second alternating voltage is in opposite phase with respect to the first alternating voltage.

3. The discharge lamp drive apparatus according to claim 1, wherein the second alternating voltage is in-phase with respect to the first alternating voltage.

4. A liquid crystal display apparatus comprising:
   a discharge lamp drive apparatus;
   a plurality of discharge lamps; and
   a liquid crystal plate, wherein
   the discharge lamp drive apparatus comprises an inverter circuit; first and second transformers; and
   a signal processor, wherein
   the inverter circuit is a circuit which converts a direct-current voltage into an alternating voltage and outputs the converted voltage,
   the first transformer receives the alternating voltage from the inverter circuit at an input winding thereof, and outputs a first alternating voltage from an output winding thereof,
   the second transformer receives the alternating voltage from the inverter circuit at an input winding thereof, and outputs a second alternating voltage from an output winding thereof,
   the signal processor receives respective voltage signals indicative of the first alternating voltage and the second alternating voltage, and generates a current-limit signal when a difference in amplitude between both the voltage signals is not smaller than a predetermined value, and the inverter circuit is controlled by the current-limit signal supplied from the signal processor, the plurality of discharge lamps are respectively aligned and arranged, and the first alternating voltage is supplied to one electrode of each discharge lamp, whilst the second alternating voltage is supplied to the other electrode of the same, and the liquid crystal plate is arranged on a front side of the discharge lamps.

5. The liquid crystal display apparatus according to claim 4, wherein the second alternating voltage is in opposite phase with respect to the first alternating voltage.

6. The liquid crystal display apparatus according to claim 4, wherein the second alternating voltage is in-phase with respect to the first alternating voltage.

* * * * *